UNITED STATES PATENT OFFICE.

FREDERICK WM. HAUSSERMANN, OF CHICAGO, ILLINOIS.

METHOD OF PRESERVING POTATOES AND OTHER VEGETABLES.

1,149,914.  Specification of Letters Patent.  Patented Aug. 10, 1915.

No Drawing.  Application filed November 21, 1914.  Serial No. 873,400.

*To all whom it may concern:*

Be it known that I, FREDERICK W. HAUSSERMANN, a citizen of the United States, residing at Chicago, in the county of Cook and State of Illinois, have invented certain new and useful Improvements in Methods for Preserving Potatoes and other Vegetables; and I do hereby declare the following to be a full, clear, and exact description of the invention, such as will enable others skilled in the art to which it appertains to make and use the same.

This invention relates to methods of preserving potatoes and other vegetables, and one of the principal objects of the invention is to provide a method of drying and preserving potatoes, carrots, beets, lentils, and other vegetables by forming a dough or plastic mass of certain vegetables and after they have been spiced, running them through heated rollers to form either flat sheets or strips of the dried and preserved materials in the form of noodles or in tubular form like spaghetti.

The general objects of the invention may be carried out as follows: I may take for instance sweet potatoes and after boiling them thoroughly and removing the skins, I boil a quantity of rice to mix with the sweet potatoes in sufficient relative proportions to form a sort of dough of plastic mass, added to this may be spices of different kinds, such as cinnamon, cloves, nutmeg, or other similar flavoring. After the dough has been mixed and kneaded properly it is passed through heated rollers and may be then cut into strips or into various figures. When this material has been properly packed it is in condition for sale, and when it is ready to be used it may be merely moistened with hot water or it may be used for flavoring soups or other dishes.

The proportions which I have found giving the best results are about equal parts of each of the materials, namely, rice and sweet potatoes.

It will be obvious that turnips or other vegetables may be treated in a similar manner and rice is considered a desirable element in making up food products of this character, for the reason, that it forms an excellent binder and has a slight flavor which will take up flavoring matter.

What is claimed is:—

1. A method of preserving potatoes which consists in boiling the potatoes, peeling the same, boiling rice, and adding the rice to the potatoes in a quantity sufficient to form a dough, rolling the materials into flat sheets or strips and cutting the same into the desired shape.

2. The method of preserving vegetables which consists in adding an equal quantity of rice to the boiled and peeled vegetable, adding spices to the mass, kneading the mass, and passing it through heated rollers.

3. A method of preserving vegetable matter which consists in boiling the vegetable, adding an equal quantity of boiled rice thereto, adding a flavoring matter to the mass and passing the mass through heated rollers to form the same into strips.

In testimony whereof I affix my signature in presence of two witnesses.

FREDERICK WM. HAUSSERMANN.

Witnesses:
 HERMAN E. EWOHN,
 ROY JUNGLAS.